United States Patent
Brenneisen et al.

[11] 3,792,973
[45] Feb. 19, 1974

[54] PROCESS FOR THE PREPARATION OF FAST DYEINGS OR PRINTS ON SYNTHETIC FIBROUS MATERIALS

[75] Inventors: Erich Brenneisen; Willi Steckelberg, both of Hofheim, Taunus, Germany

[73] Assignee: Farbwerke Hoechst Aktiengesellschaft vormals Meister Lucius & Bruning, Frankfurt, Germany

[22] Filed: Feb. 22, 1973

[21] Appl. No.: 334,779

[30] Foreign Application Priority Data
Feb. 26, 1972   Germany............................ 2209208

[52] U.S. Cl. ...................... 8/41 A, 8/41 R, 8/41 B, 8/41 C, 8/41 D, 8/71, 8/94, 260/193
[51] Int. Cl. ...................... D06p 3/72, C09b 29/32
[58] Field of Search 8/41 R, 41 A, 41 B, 41 C, 41 D, 8/71, 94; 260/193

[56] References Cited
UNITED STATES PATENTS
3,165,507   1/1965   Braun et al. ......................... 260/193

FOREIGN PATENTS OR APPLICATIONS
587,259   4/1947   Great Britain ...................... 260/193
1,164,365   10/1958   France ................................ 260/193
71,740   1/1960   France ............................... 260/193

*Primary Examiner*—Donald Levy
*Assistant Examiner*—Bruce H. Hess
*Attorney, Agent, or Firm*—Curtis, Morris & Safford

[57]   ABSTRACT

A process for the preparation of fast dyeings or prints on synthetic fibrous materials, which comprises treating the said fibrous materials in aqueous dispersion or in an organic solvent with a dyestuff of the formula (1)

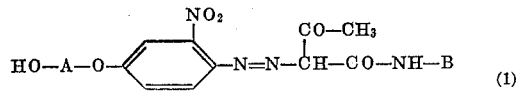

in which A represents a linear or branched alkylene group of 1 to 4 carbon atoms being unsubstituted or substituted by methoxy, ethoxy, phenoxy or hydroxyl, and B represents phenyl being unsubstituted or substituted by fluorine, chlorine, bromine, cyano, trifluoromethyl, acetyl, benzoyl, phenyl, phenoxy, alkyl of 1 to 4 carbon atoms or alkoxy of 1 to 4 carbon atoms or by combinations of 2 or 3 members thereof, or naphthyl the yellow dyeings or prints so obtained being distinguished by excellent fastness properties, particularly by a very good fastness to light, a high resistance to sublimation and, furthermore, by very good colour yields.

11 Claims, No Drawings

PROCESS FOR THE PREPARATION OF FAST DYEINGS OR PRINTS ON SYNTHETIC FIBROUS MATERIALS

The present invention relates to a process for the preparation of fast dyeings or prints on synthetic fibrous materials.

The present invention provides a process for the preparation of valuable dyeings or prints on synthetic fibrous materials by treating these materials with dyestuffs of the general formula 1

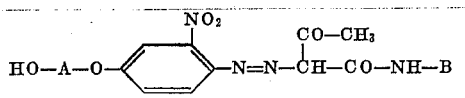 (1)

wherein A is a linear or branched alkylene group having from 1 to 4 carbon atoms which may be substituted by a methoxy, ethoxy or phenoxy or a hydroxy group and B is a naphthyl radical or a phenyl radical each of which may be substituted by a fluorine, a bromine or a chlorine atom, by cyano, trifluoromethyl, acetyl, benzoyl, phenyl, phenoxy and/or alkyl and/or alkoxy groups having from 1 to 4 carbon atoms, in aqueous dispersion or in organic solvents.

Preferably used are dyestuffs of the general formula 2

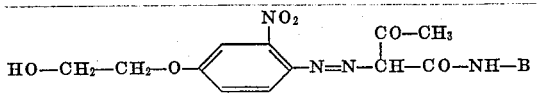 (2)

wherein B is defined as above.

The dyestuffs may also be used in admixture with one another or with other dyestuffs.

The dyestuffs used in accordance with the invention are prepared in generally known manner by diazotizing a diazo component of the general formula (3)

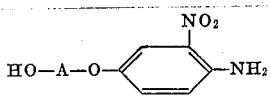 (3)

preferably the 3-nitro-4-amino-β-hydroxyphenetol of the formula (4)

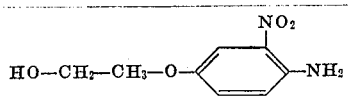 (4)

for example in mineral acid solution or suspension with nitrite and coupling it with a coupling component of the general formula (5)

(5)

for example in slightly alkaline, neutral or acetoacetic solution or suspension. In the formulae (3) and (5) A and B are defined as above.

Suitable synthetic fibrous materials are, for example, those of cellulose esters, polyesters, polyamides, polyurethanes, polyolefins and polyacrylonitriles, among which are especially preferred for the dyeing and printing process of the invention those of cellulose esters, such as cellulose acetate and cellulose triacetate, polyamides, such as poly-ε-caprolactam and of polyesters, such as polyethylene terephthalate. The synthetic fibrous materials may also be present in mixture with one another or with natural fibrous materials, such as cellulose fibers or wool. Furthermore, they can be present in different processing states, for example, as combed material, flock, threads, fabric or knitted fabric.

The dyestuffs used in accordance with the invention are applied, on principle, in known manner, generally from an aqueous dispersion, but they may also be applied from organic solvents. The dyestuffs may be dispersed, for example, by grinding in the presence of a dispersing agent, for example, the condensation product of formaldehyde and a naphthalene sulfonic acid.

Besides, the dyeing conditions largely depend on the nature of the synthetic fibrous materials and their processing state.

Shaped articles of cellulose acetate, for example, are dyed in a temperature range of about 75° to about 85° C. Cellulose triacetate fibers are dyed at a temperature ranging from about 90° to about 125° C. The dyestuffs are applied on polyamide fibrous materials at a temperature within the range of from about 90° to about 120° C. Fibrous materials of polyesters are dyed according to the methods therefore known, by dyeing the material in the presence of carriers, such as o-phenylphenol or p-phenylphenol, methylnaphthalene or methylsalicylate at a temperature of about 100° C or by dyeing this material without using carriers at correspondingly elevated temperatures, for example, within the range of from about 120° C to about 140° C. The process of the invention may also be carried out in such a manner that the dyestuffs are applied to the fibrous materials mentioned by padding with or without thickening agent, for example, tragacanth thickening and that they are fixed by the action of heat, for example, steam or dry heat for about ½ to 30 minutes at a temperature ranging from about 100° C to about 230° C. Superficiously adhering dyestuff is then advantageously removed from the material so dyed to improve the abrasion resistance, for example, by rinsing or by a reductive after-treatment. This reductive after-treatment is generally carried out at a temperature ranging from about 60° C to about 120° C in an aqueous sodium hydroxide solution, sodium dithionite and a non ionogen detergent, for example, a liquid containing an ethylene oxide-phenol-addition product.

Dyeing of synthetic fibrous materials from organic solvents can be carried out, for example, in such a manner that the dyestuff is absorbed by the fiber from the solution at room temperature or above, preferably at from about 70° to about 130° C, if necessary under pressure, or that in a continuous operation the woven or knitted fabric is impregnated with a dyestuff solution, dried and subjected to a short-time action of heat, for example, at a temperature ranging from about 180° C to about 210° C. Suitable solvents for the exhaustion method are, for example, those which are not miscible with water and have a boiling point ranging from about 40° C to about 170° C, for example, the aliphatic halogenated hydrocarbons, such as methylene chloride, trichloroethane, trichloroethylene, perchloroethylene or trifluorotrichloroethane. Especially in the case of a continuous dyeing method solvents which are miscible with water may also be used, for example, alcohols or dimethyl formamide. The solvents may, of course, be present as mixtures, and they may contain further auxiliaries soluble in solvents, for example, oxalkylating products of fatty alcohols, alkyl phenols and fatty acids.

To prepare prints on synthetic fibrous materials, for example those of polyesters, polyamides or cellulosetriacetates, the dyestuffs to be used in accordance with the invention can be used in the form of water-containing preparations which may contain in addition to the finely dispersed dyestuff adequate thickening agents and fixation accelerators. Fixation is carried out, for example, after printing and drying by steaming under atmospheric pressure or under elevated pressure up to 2.5 atmospheres gage during 10 to 60 minutes, but it may also be obtained by the action of hot air of about 160° to about 210° C during 30 seconds to 10 minutes.

The dyestuffs of the invention yield yellow dyeings and prints of excellent fastness properties, especially, of very good fastnesses to light. They are, also, distinguished by very good colour yields and a high resistance to sublimation.

As compared with dyeing and prints which have been prepared with structurally comparable dyestuffs described in French Pat. No. 1,164,365 and the addition U.S. Pat. No. 71,740, the dyeings and prints of the invention are distinguished by considerably superior dyeing properties among which the superior resistance to sublimation, the higher colour yields and the improved fastness to light are to be espially pointed out.

The following Examples illustrate the invention, the parts and percentages being by weight and the relationship of parts by volume to parts by weight being as the liter to the kilogram under normal conditions.

EXAMPLE 1

10 Parts of polyester fabric were introduced into a dyebath heated to 50° C which consisted of 400 parts of softened water and 0.2 part of the dyestuff of the formula (6)

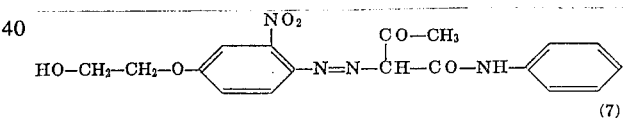

(6)

in a finely dispersed form.

The pH of the dyebath was adjusted to 5–5.5 with ammonium sulfate and acetic acid. Within 40 to 60 minutes the temperature was raised to 130° C and the material was dyed at that temperature during 60 minutes.

Then, the fabric was removed, rinsed and reductively after-treated at 80°–90° C during 20 minutes in a bath which contained in one liter 6 parts of sodium hydroxide solution (38° Be), 4 parts of sodium dithionite and 1 part of a non ionogen detergent. Then, the fabric so dyed was rinsed and dried.

A yellow dyeing was obtained which had excellent fastness properties and a high tinctorial strength. Similar results were obtained when using instead of polyester fabric a fabric of cellulose triacetate fibers and dyeing was effected at 110° C. Dyeings of equally good fastness properties were obtained when a polyester yarn was dyed for 30 minutes at 120° C in a closed apparatus with the dyestuff of the formula (6) mentioned above from perchloroethylene. The dyestuff of the formula (6) could be prepared in the following manner:

39.6 Parts of 3-nitro-4-amino-β-hydroxy-ethoxybenzene were dissolved while hot in 400 parts of water and 120 parts of 5N hydrochloric acid and, after having been poured onto 2,000 parts of ice water, they were diazotized with 40 parts by volume of a 5 N sodium nitrite solution.

39.0 Parts of the coupling component 4-methyl-acetoacetylanilide were dissolved in 800 parts of water and 54 parts by volume of a 33 percent aqueous sodium hydroxide solution at room temperature and reprecipitated after the addition of two parts of a non-ionogen emulsifier, for example the reaction product of an oleyl alcohol with 30 mols of ethylene oxide by rapidly adding 40 parts by volume of acetic acid in finely dispersed form while stirring.

The diazo solution was added and the pH was adjusted at 6.5 with 2 N sodium hydroxide solution.

The dyestuff which precipitated was isolated by filtration and washing. It can be dried or given a finely dispersed form in the form of the water-containing filter residue using commercial dispersion agents, for example, a condensation product of formaldehyde and a naphthalene sulfonic acid.

EXAMPLE 2

10 Parts of a polyester yarn were introduced into a dyebath heated to 60° C which consisted of 300 parts of softened water, 0.3 part of the dyestuff of the formula (7)

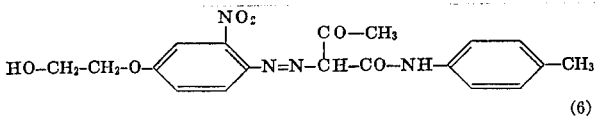

(7)

in a finely dispersed form, one part of a commercial carrier, for example o-phenylphenol and 0.5 part of ammonium sulfate.

The pH of the dyebath was adjusted at 5–5.5 with acetic acid. Within 30 to 60 minutes the temperature was raised to the boiling point and the fabric was dyed at that temperature for 90 minutes.

The material dyed was then after-treated as described in Example 1 and finished.

In an analogous manner a fibrous material of polyamide was dyed the dyebath being in this case advantageously adjusted at pH 6–6.5. The reductive after-treatment is no longer necessary nor is the addition of a carrier.

The dyestuff of the formula (7) mentioned above was obtained when using as the coupling component 36.1 parts of acetoacetylanilide and proceding then in the same manner as described in Example 1.

EXAMPLE 3

A polyester-cellulose blended fabric was impregnated at 25°–30° C with a dyebath which was adjusted to pH 5–5.5 with acetic acid and contained 10 g per liter of the finely dispersed dyestuff of the formula (8)

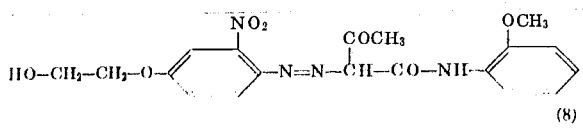

(8)

Then, the material was dried at temperatures ranging between 100° and 110° C. The fixation was effected by means of dry heat at 190° to 230° C during 30 to 90 seconds. Then, reductive after-treatment as described in Example 1 and finishing followed.

A reddish yellow dyeing of excellent fastness properties was obtained, especially of a very good resistance to sublimation. Similarly appreciable dyeing were obtained when fibrous materials of polyamide or cellulose triacetate were dyed in the manner described above.

The dyestuff of the above formula (8) was obtained as described in Example 1 when the coupling component used was 44.1 parts of 2-methoxyacetoacetyl anilide.

EXAMPLE 4

A polyester fabric was printed and dried with a printing paste which contained per 1,000 parts in addition to a commercial thickening agent, for example, alginate or starch ether and other usual adjuvants 200 parts of an aqueous dyestuff preparation which contained 10 percent of the finely dispersed dyestuff of the formula (9)

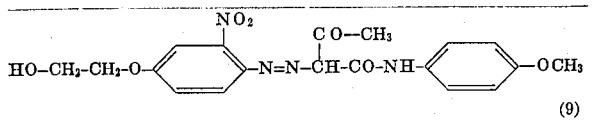

(9)

Then, fixation was effected with dry heat at 200° C for 60 seconds.

The print was rinsed, reductively after-treated in a bath which contained sodium dithionite and sodium hydroxide solution, purified in another bath which contained a non ionogen detergent, for example the condensation product of nonyl phenol and 10 mols of ethylene oxide, rerinsed and dried.

A reddish yellow print was obtained which had a high tinctorial strength and excellent fastness properties, especially an excellent fastness to thermofixation.

Similarly good results were obtained when the fixation was effected during 20 minutes with pressure steam of 2 atmg.

When using instead of a polyester fabric a fabric of cellulose triacetate, without reductive after-treatment, prints were obtained which had the same high tinctorial strength and very good fastness properties.

the dyestuff of the above formula (9) was obtained in the manner described in Example 1 when the coupling component used was 44.1 parts of 4-methoxy-acetoacetyl anilide.

EXAMPLE 5

A fabric of polyester fibers was printed and dried with a printing paste as described in Example 4 which, however, contained the dyestuff of the formula (10)

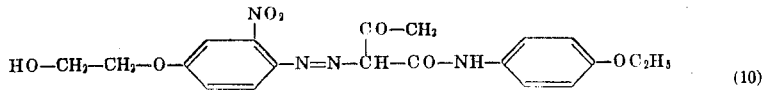

(10)

Fixation was carried out by steaming under atmospheric pressure during 30 minutes.

When the after-treatment and the drying had been completed, a reddish yellow print of high tinctorial strength and good fastness properties was obtained.

Appreciable prints were obtained, too. When printing instead of a polyester fabric one of polyamide or cellulose acetate fibers.

The dyestuff or formula (10) indicated above was obtained in the manner described in Example 1 when the coupling component used was 46.7 parts of 4-ethoxy-acetoacetyl anilide.

The following Table contain a list of further dyestuffs usable in accordance with the invention which correspond to the general formula (1)

$$HO-A-O-\underset{NO_2}{\underset{|}{\bigcirc}}-N=N-\underset{CO-CH_3}{\underset{|}{CH}}-CO-NH-B \quad (1)$$

| Ex. No. | A | B | Shade on polyester fibers |
|---|---|---|---|
| 6 | —C₂H₄— | 2-methyl-phenyl | Yellow. |
| 7 | —C₂H₄— | 4-ethyl-phenyl | Do. |
| 8 | —C₂H₄— | 4-t-butyl-phenyl | Do. |
| 9 | —C₂H₄— | 4-i-propyl-phenyl | Do. |
| 10 | —C₂H₄— | α-Naphthyl | Do. |
| 11 | —C₂H₄— | 4-biphenyl | Do. |
| 12 | —C₂H₄— | 3-methyl-phenyl | Do. |
| 13 | —C₂H₄— | 2,4-dimethyl-phenyl | Do. |
| 14 | —C₂H₄— | 2,5-dimethyl-phenyl | Do. |
| 15 | —C₂H₄— | 2-chloro-phenyl | Do. |
| 16 | —C₂H₄— | 3-chloro-phenyl | Do. |
| 17 | —C₂H₄— | 4-chloro-phenyl | Do. |
| 18 | —C₂H₄— | 4-fluoro-phenyl | Do. |
| 19 | —C₂H₄— | 4-bromo-phenyl | Do. |
| 20 | —C₂H₄— | 3-cyano-phenyl | Do. |
| 21 | —C₂H₄— | 2-phenoxy-phenyl | Reddish yellow. |
| 22 | —C₂H₄— | 4-trifluoro-methyl-4-chloro-phenyl. | Yellow. |
| 23 | —C₂H₄— | 3-methoxy-phenyl | Reddish yellow. |
| 24 | —C₂H₄— | 4-butoxy-phenyl | Do. |
| 25 | —C₂H₄— | 2-ethoxy-phenyl | Do. |
| 26 | —C₂H₄— | 3-acetyl-phenyl | Yellow. |
| 27 | —C₂H₄— | 2,4-dichloro-phenyl | Do. |
| 28 | —C₂H₄— | 3-benzoyl-phenyl | Do. |
| 29 | —C₂H₄— | 2,4,5-trichloro-phenyl | Do. |
| 30 | —C₂H₄— | 2-chloro-4-methyl-phenyl | Do. |
| 31 | —CH₂— | 4-methoxy-phenyl | Reddish yellow. |
| 32 | —(CH₂)₃— | Phenyl | Yellow. |
| 33 | —CH(CH₃)CH₂— | do | Do. |
| 34 | —CH₂CH(OH)CH₂— | do | Do. |
| 35 | —CH—CH₂—<br>$\|$<br>CH₂—O—C₆H₅ | do | Do. |
| 36 | —CH—CH₂—<br>$\|$<br>CH₂—O—CH₃ | do | Do. |
| 37 | —CH(CH₃)CH₂— | 4-chloro-phenyl | Do. |
| 38 | —CH—CH₂—<br>$\|$<br>CH₂—O—C₆H₅ | 4-methyl-phenyl | Do. |

We claim:
1. A process for the preparation of fast dyeings or prints on synthetic fibrous materials, which comprises treating the said fibrous materials in a dye bath selected from the group consisting of an aqueous dispersion, an organic solvent and mixtures thereof with a dyestuff of the formula (1)

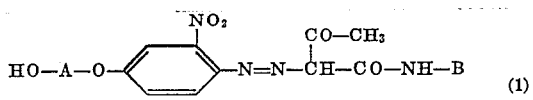 (1)

in which A represents a linear or branched alkylene group of 1 to 4 carbon atoms being unsubstituted or substituted by methoxy, ethoxy, phenoxy or hydroxyl, and B represents phenyl being unsubstituted or substituted by fluorine, chlorine, bromine, cyano, trifluoromethyl, acetyl, benzoyl, phenyl, phenoxy, alkyl of 1 to 4 carbon atoms or alkoxy of 1 to 4 carbon atoms or by combinations of 2 or 3 members thereof, or naphthyl.

2. A process as claimed in claim 1, wherein the synthetic fibrous material is selected from the group consisting of cellulose acetate, cellulose-triacetate, polyamides, polyurethanes, polyolefins, polyacrylonitriles and polyesters.

3. A process as claimed in claim 1, wherein the said fibrous materials are dyed with an aqueous dispersion of the said dyestuffs at a temperature between 75° and 140° C in the absence or in the presence of a carrier.

4. A process as claimed in claim 1, wherein the said fibrous materials are dyed with the said dyestuffs from organic solvents between room temperature and about 130° C.

5. A process as claimed in claim 1, wherein the said fibrous materials are padded with an aqueous dispersion of the said dyestuffs and the dyestuffs are subsequently fixed at elevated temperature.

6. A process as claimed in claim 5, wherein the aqueous dispersion of the dyestuffs contains a thickening agent.

7. A process as claimed in claim 5, wherein the dyestuffs are fixed by steaming or treating them with dry heat at a temperature between about 100° and about 230° C.

8. A process as claimed in claim 1, wherein the fibrous materials are impregnated with the said dyestuffs from an organic solvent and dried, and the dyestuffs are subsequently fixed by a short-time action of heat.

9. A process as claimed in claim 1, wherein the dyestuffs are fixed by a short-time action of heat at a temperature of from about 180° C to about 210° C.

10. A process as claimed in claim 1, wherein the said fibrous materials are printed with water-containing preparations of the said dyestuffs and the dyestuffs are subsequently fixed by drying the prints and steaming them under atmospheric pressure or elevated pressure of up to 2.5 atmg or by a short-time action of hot air of about 160° to about 210° C.

11. A process as claimed in claim 10, wherein the water-containing preparations of the dyestuffs contain a member selected from the group consisting of a thickening agent, a fixing accelerator and a combination thereof.

* * * * *